Dec. 19, 1922.
C. H. HAPGOOD.
SCALE.
FILED DEC. 10, 1919.
1,439,470.
2 SHEETS—SHEET 1.
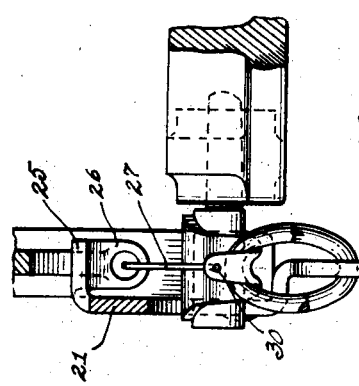
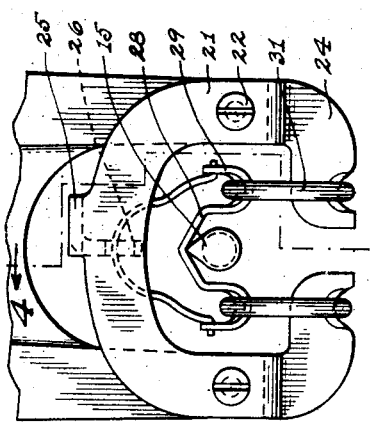
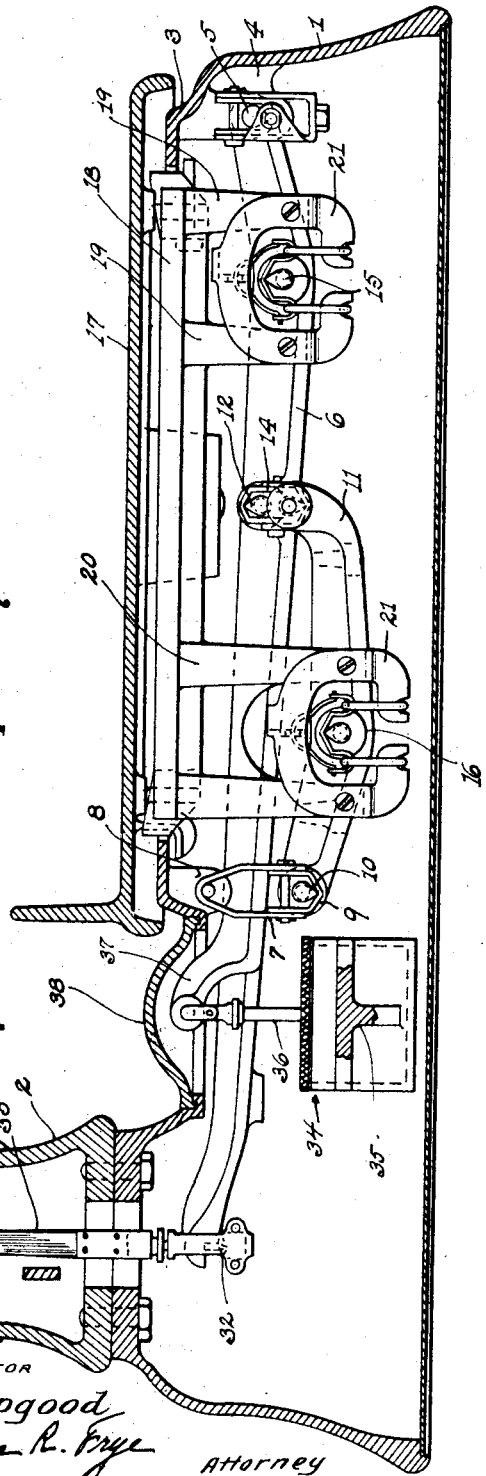
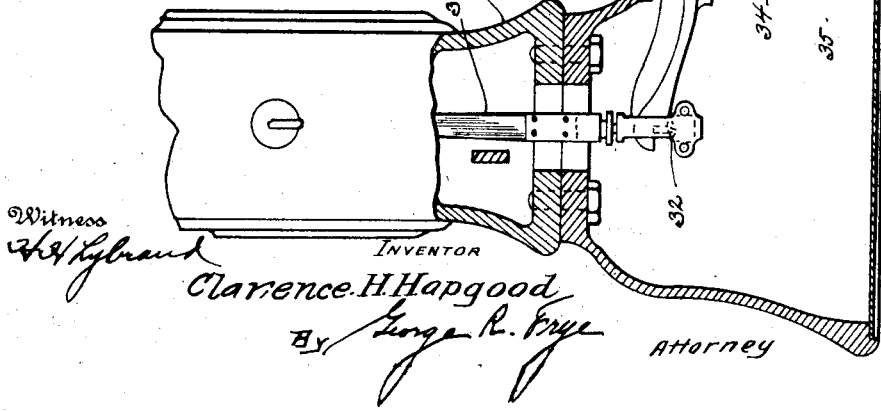
INVENTOR
Clarence H. Hapgood
By George R. Frye
Attorney

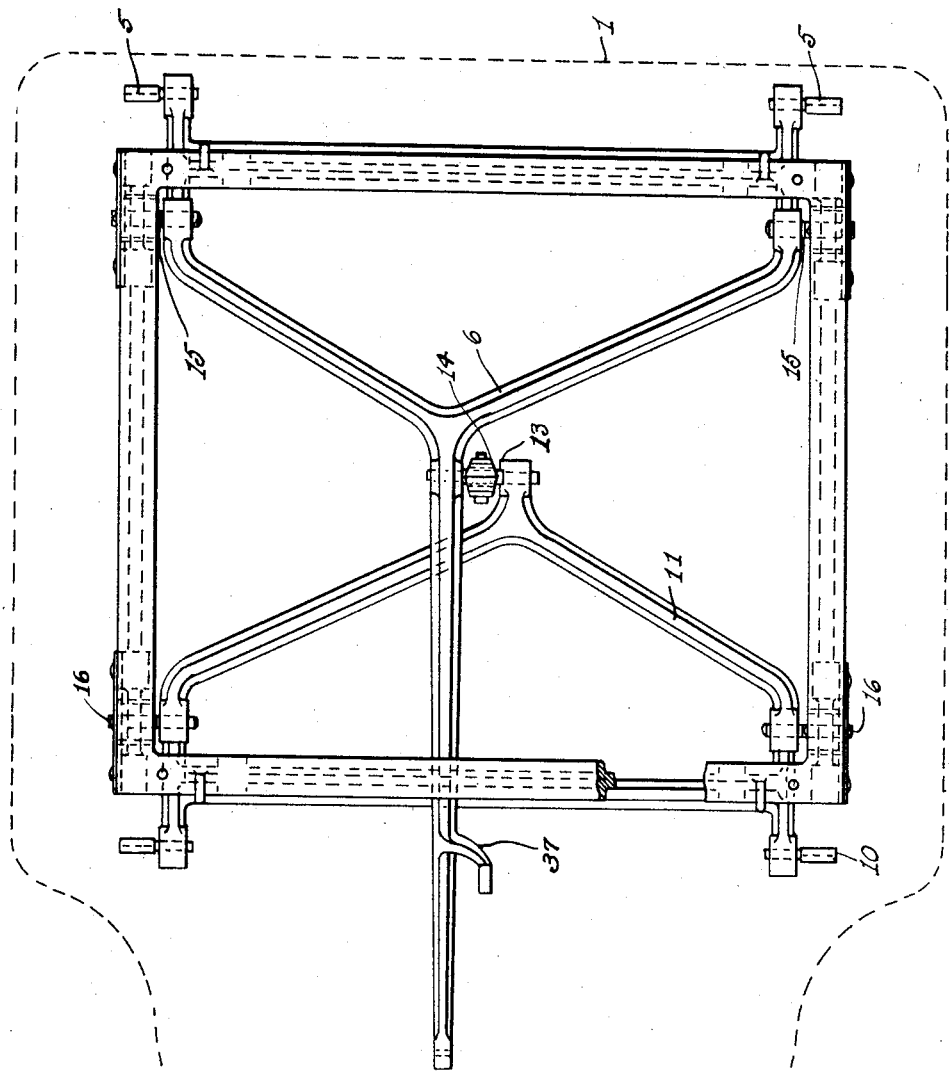

Patented Dec. 19, 1922.

1,439,470

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

SCALE.

Application filed December 10, 1919. Serial No. 343,855.

*To all whom it may concern:*

Be it known that I, CLARENCE H. HAPGOOD, a citizen of the United States, residing at Toledo, in the county of Lucas and State of Ohio, have invented certain new and useful Improvements in Scales, of which the following is a specification.

This invention relates to weighing scales and particularly to the lever mechanism of a scale of the platform type. In platform lever mechanism which is so arranged that lateral movement of the platform is communicated to the pivot bearings, the wear on the pivots is very great. One of the objects of this invention is to eliminate the wear incident to lateral movement of the platform by providing efficient and inexpensive suspension bearings which will permit movement of the platform while allowing the bearings and pivots to remain relatively stationary.

Another object of the invention is the provision of a link suspension for scale platforms which will allow limited lateral movement of the platform without the use of check links.

Another object is to provide a link suspension adapted for use with levers having pivots projecting from one side only.

Another object is to provide a device for flexibly suspending the platform from the levers by means of links, the upper ends of which are located below the range line of the pivots.

Another object is the provision of a simple, efficient and inexpensive device to prevent the platform spider, suspension links and pivot bearings from becoming disassembled when the spider is lifted from the levers.

With the above and other objects in view, which will readily appear as the invention is better understood, my invention consists of the novel construction, combination and arrangement of parts to be hereinafter more fully described and pointed out in the subjoined claims.

Reference is to be had to the accompanying drawings illustrating a preferred embodiment of my invention and wherein similar reference characters designate similar parts throughout the several views.

In the drawings:

Figure 1 is a vertical longitudinal section through the platform and base housing of a platform scale embodying my invention, showing the platform spider, platform levers, and the suspension device in elevation;

Figure 2 is a top plan view of the platform levers and platform spider of the scale shown in Figure 1;

Figure 3 is an elevation of a platform spider support with a pivot bearing connected thereto; and Figure 4 is a vertical section on the line 4—4 of Figure 3.

Referring to the drawings in detail, the base housing 1 enclosing the platform lever mechanism is shown as carrying a column or upright housing 2 adapted to contain the load-offsetting mechanism of the scale (not shown). The base housing 1 has an opening 3 in its upper wall through which the means for supporting the platform from the platform levers extends. Rigidly supported upon the rear wall of the base housing is a pair of brackets 4 which carry the bearings for supporting the fulcrum pivots 5 of the main platform lever 6. Flexibly supported at the forward portion of the base housing 1 by means of links 7 carried by brackets 8 upon the base housing is a pair of pivot bearings 9 for co-operation with the fulcrum pivots 10 of the auxiliary platform lever 11.

The main platform lever 6 is substantially Y-shaped (see Figure 2), and projecting from one side thereof near the juncture of the arms of the Y is a knife-edge pivot 12, whereby connection is made to the substantially V-shaped auxiliary lever 11, a knife-edge pivot 13 projecting therefrom below and in line with the knife-edge pivot 12. The knife-edge pivots 12 and 13 are connected by means of a jointed link 14 having a V-shaped bearing at each end thereof for co-operation with the knife edges of the said pivots. Projecting laterally from each side of the Y-shaped main platform lever 6 is a load bearing pivot 15, and projecting laterally from the outer side of each arm of the V-shaped auxiliary lever 11 is a load bearing pivot 16.

The platform 17 of the scale is carried by a platform spider which consists essentially of a rectangular frame 18 having a pair of projections 19 extending downwardly from each of the rearward corners thereof and a pair of somewhat longer projections 20 extending downwardly from each of the forward corners thereof. Rigidly secured to each of the several pairs of projections 19 and 20 are similar U-shaped supporting members 21, the legs of the said supporting members being secured to the projections by means of screws 22. The legs of the said U-shaped supporting members are offset, as at 23, to form bearings for the ends of the several projections 19 and 20, and projecting toward each other from the offset portions of the U-shaped supporting members are notched feet 24. The bight of each of the U-shaped members 21 has projecting therefrom a lug 25 which carries a depending apertured ear 26, and a bail 27 passes through each of the ears in position to suspend therefrom a bearing member 28. The bearing members 28 are each formed to substantially the shape of a shallow inverted V, having a hook 29 formed upon each end thereof, the said hooks opening upwardly. The ends of the bail 27 are engaged at 30 in apertures in the ends of said hooks. A link 31 depends from each of the hooks 29, and when the bearing 28 is in position on the pivot 16 the lower portion of the links 31 engage the notches in the feet 24 and thereby flexibly support the platform. It will be noted upon reference to the drawings that the hooks 29 are below the knife edges so that there is no tendency of the bearing to rock or slide on the pivot when the links swing in the hooks. When the platform is moved laterally in any direction the links will be given a parallel swinging movement, but there will be absolutely no rocking or shifting movement of the bearings on the pivots.

Since the fulcrum pivots of the main platform lever are mounted in bearings which are rigid with the base housing, the nose pivot 32 of the main platform lever 6 always moves in the same path during the weighing operation and consequently the pull on the connection 33 is subjected to less variation than would be the case with the fulcrum pivots mounted in swinging bearings. This manner of fulcruming the main lever also makes it practicable to connect the dash pot directly thereto. The dash pot 34 is carried by a bracket 35 rigidly secured to the base housing and the plunger rod 36 is pivotally connected to an arm 37 formed upon the main lever 6. Convenient access to the dash pot is had by removing the hand-hole cover 38.

When the parts are in assembled relation, as shown in the drawings, the bail 27 is idle. It is apparent, however, that but for the bail 27 the loosely connected parts 28 and 31 would collapse and become disassembled when the platform spider was lifted. With the bail in place the bearing member 28 and links 31 are suspended from the ear 26 when the spider is lifted, the links remaining in engagement with the notched feet 24. The bearings are thus held in position to engage the pivots when the spider is replaced. The U-shaped members 21 may be inexpensively stamped from sheet metal, and the parts are easily assembled.

While it will be apparent that the illustrated embodiment of my invention herein disclosed is well calculated to adequately fulfill the objects primarily stated, it is to be understood that my invention is susceptible to variation, modification and change without departing from the spirit and scope of the invention as set forth in the subjoined claims.

Having described my invention, I claim:

1. The combination with a scale lever having a load pivot, a bearing member engaging said pivot, a platform support, means by which said support is carried swung from said bearing member, and a bail connected to said bearing member and engaging the support to suspend the bearing member therefrom when the support is lifted.

2. The combination with a scale lever having a load pivot, a bearing member engaging said pivot, a platform support, means by which said support is carried swung from said bearing member, an ear projecting from said platform support, and a bail connected to said bearing member and engaging said ear to suspend the bearing member therefrom when the support is lifted.

3. The combination with a scale lever load pivot, of a bearing member, a platform spider, a pair of downwardly-extending projections upon said spider, a U-shaped supporting member secured to said projections, the legs of said U-shaped supporting member having offset portions for engaging the ends of said projections, means for swinging said supporting member from said bearing member, and a bail connected to said bearing member and engaging said supporting member to suspend the bearing member therefrom when the platform spider is lifted.

4. In a platform scale, in combination, platform levers having load pivots, bearing members resting on said load pivots, a platform spider having downwardly-extending projections thereon, U-shaped supporting members secured to said projections, the legs of said U-shaped members having offset portions, said offset portions engaging the ends of said projections, feet extending from said offset portions, links supporting said feet from said bearing members, and bails connected to said bearing members and engaging said supports to support the bearing members therefrom when the platform spider is lifted.

5. In a platform weighing scale, having platform levers, means for supporting a platform from said levers comprising, in combination, a set of load pivots, a bearing member for each pivot, a pair of hooks carried by each bearing member below the pivot bearing portions thereof, a link depending from each hook, and a U-shaped supporting member carried by each pair of links, said supporting members being connected to said platform.

6. In a platform weighing scale having platform levers, means for supporting the platform from said levers comprising, in combination, a set of load pivots, a bearing member for each pivot, a pair of hooks carried by each bearing member below the pivot bearing portion thereof, a link depending from each hook, and a U-shaped supporting member for each bearing member having a pair of notched feet engaging said links whereby the supporting member is swung from said pair of hooks.

7. In a platform weighing scale having platform levers, means for supporting the platform from said levers comprising, in combination, a set of load pivots, a bearing member for each pivot and a pair of hooks carried by each bearing member, a link depending from each hook, a U-shaped supporting member carried by each pair of links, an apertured ear projecting from each said supporting member, and bails passing through said ears and having their ends connected to the corresponding pairs of hooks.

8. In a platform weighing scale having platform levers, means for supporting the platform from said levers comprising, in combination, a set of load pivots, a bearing member for each pivot and a pair of hooks carried by each bearing member, a link depending from each hook, a U-shaped supporting member carried by each pair of links, an apertured ear projecting from each said supporting member, bails passing through said ears and having their ends connected to the corresponding pairs of hooks, and a platform spider having a pair of downwardly-extending projections secured to each supporting member.

9. In a scale, the combination with a pivot bearing member, a supporting member and means suspending said supporting member from said pivot bearing member suspended therefrom, of a bail carried by said bearing member and engaging said supporting member.

10. In a scale, the combination with a pivot bearing member, of links suspended from a portion of said bearing member and lying throughout their lengths below the pivot bearing portion thereof, and means carried by said links for supporting the platform.

11. In a scale, the combination of a pivot bearing member having hooks depending therefrom, said hooks lying below the pivot bearing portion of said member, links suspended from said hooks, and means carried by said links for supporting the platform.

12. In a scale, the combination of a pivot bearing member having hooks depending therefrom, a platform supporting member, links suspending said supporting member from said hooks, and a bail connected to said pivot bearing member and adapted to be carried by said supporting member when said supporting member is lifted from said bearing.

CLARENCE H. HAPGOOD.

Witnesses:
C. O. MARSHALL,
C. E. WILCOX.